United States Patent [19]

Mérant

[11] Patent Number: 4,769,979
[45] Date of Patent: Sep. 13, 1988

[54] MACHINE FOR HARVESTING FRUIT AND BERRIES AND THE LIKE, FROM FRUIT TREES AND BUSHES PLANTED IN A ROW

[75] Inventor: Jean-Camille Mérant, Doue la Fontaine, France

[73] Assignee: Braud, Société Anonyme, France

[21] Appl. No.: 111,494

[22] Filed: Oct. 16, 1987

[30] Foreign Application Priority Data

Oct. 27, 1986 [FR] France .................................. 86 14877

[51] Int. Cl.4 ............................................ A01D 46/28
[52] U.S. Cl. ...................................... 56/330; 56/328.1
[58] Field of Search ....................... 56/328.1, 330, 329, 56/DIG. 19

[56] References Cited

U.S. PATENT DOCUMENTS 4,250,700  2/1981  Horn et al. ............................. 56/330
4,336,682  6/1982  Orlando ................................. 56/330
4,370,847  2/1983  Arnaud .................................. 56/330

FOREIGN PATENT DOCUMENTS 2657125  7/1977  Fed. Rep. of Germany ........ 56/330
2417248 10/1979  France .................................... 56/330
 743627  6/1980  U.S.S.R. ............................... 56/330

Primary Examiner—John Weiss

[57] ABSTRACT

In order to ensure well controlled speed and amplitude of motion of the shaker members (11) of this harvesting machine, while still allowing said shaker members to adapt well individually to the thickness of the vegetation of fruit trees and bushes, the shaker members are constituted by rods (11) made of a material having a high degree of flexibility, and the rods are curved into an arcuate shape with its convex side facing towards the longitudinal mid axis (12) of the machine. The ends of the flexible rods (11) are held at a substantially constant distance from said longitudinal mid axis, and a control mechanism (20) is provided to cause the curvature of the flexible rods to vary cyclically about an average value of curvature in such a manner that one of said flexible rods has its maximum value of curvature when the corresponding flexible rod on the opposite side has its minimum value of curvature, and vice versa.

17 Claims, 6 Drawing Sheets

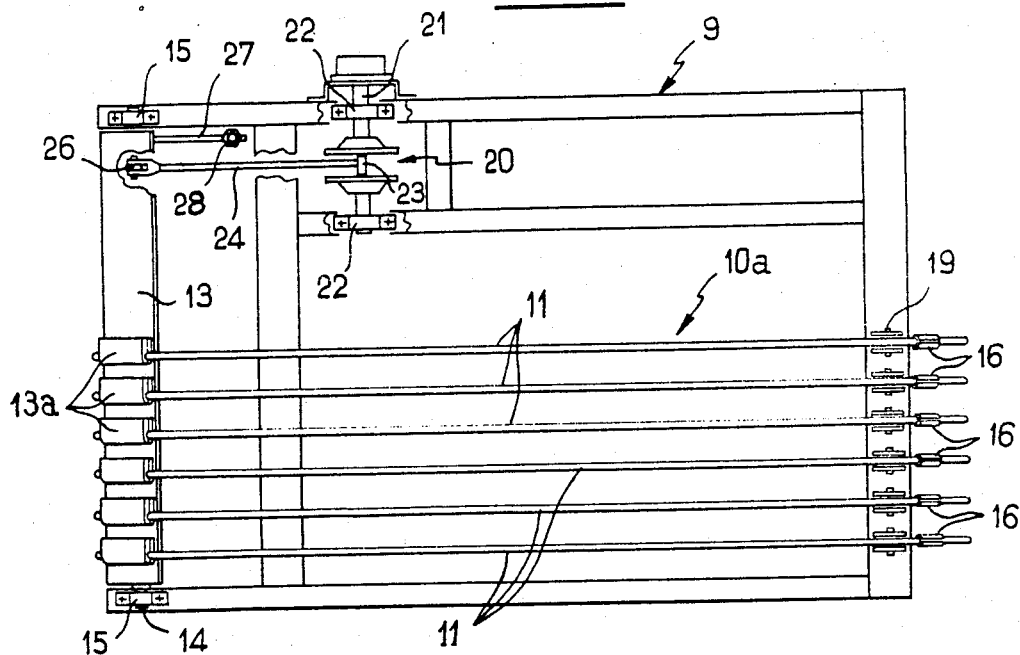
FIG_3
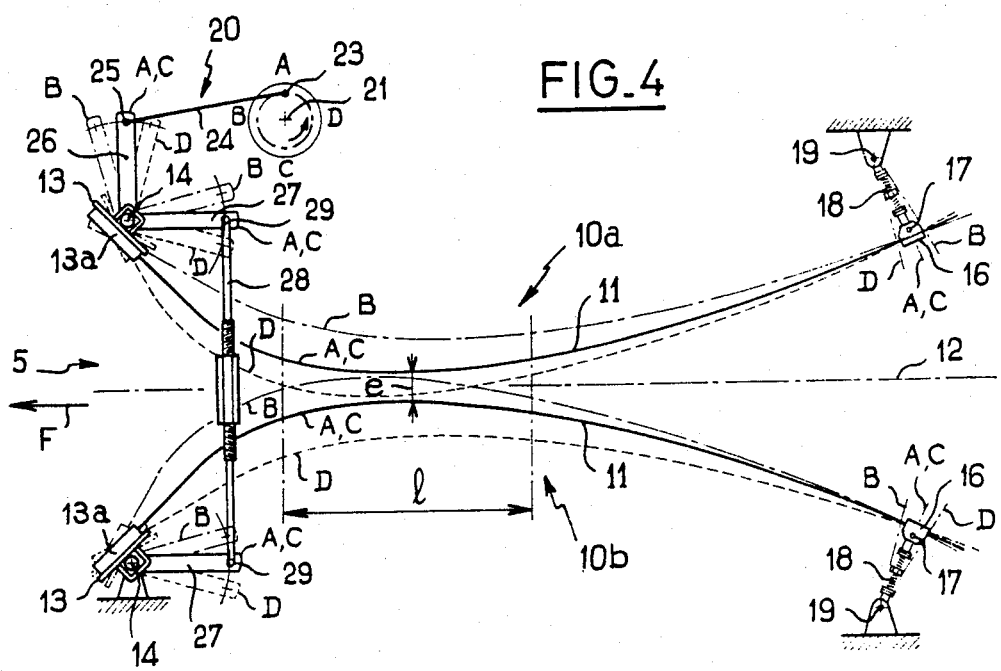
FIG_4

MACHINE FOR HARVESTING FRUIT AND BERRIES AND THE LIKE, FROM FRUIT TREES AND BUSHES PLANTED IN A ROW

FIELD OF THE INVENTION

The present invention relates to a machine for harvesting fruit and berries and the like, from fruit trees and bushes planted in rows, the machine comprising a straddling chassis capable of moving along a field, together with a shaker assembly mounted on the chassis and including at least one pair of elongated shaker members which extend generally horizontally in the direction of the longitudinal mid axis of the machine and which are spaced transversely from one another and situated respectively on opposite sides of said longitudinal mid axis, each shaker member being constituted by a rod having both of its ends connected to a support, and shaped in such a manner that, going rearwardly from the front of the machine, and together with the opposite rod, it defines a converging inlet, an active shaking zone, and a diverging outlet for fruit trees and bushes, the shaker assembly further including a control mechanism connected to the rods to drive them synchronously with a reciprocating motion in a direction extending transversely relative to said longitudinal mid axis.

The invention relates particularly, but not exclusively, to harvesting grapes, and it is described in greater detail with reference to this type of harvesting, even though the machine of the present invention is also capable of being used for harvesting other fruits and berries, for example black currants, gooseberries, raspberries, or coffee grains.

BACKGROUND OF THE INVENTION

Most prior grape-picking machines use practically the same principle for harvesting grapes. This is to beat or shake the vine by imparting sinusoidal or pseudo-sinusoidal motion thereto at an amplitude and at a frequency suitable for causing the grapes or the bunches of grapes to become detached. This motion is communicated to the vine via shaker or beater members disposed in such a manner as to act either on the vinestock or stem or else on the vegetation, i.e. on the fruit-bearing portion of the vine, depending on the type and number of shaker or beater members used. The percentage of bunches and/or individual grapes which are detached from the vine depends on the number and the amplitude of the oscillations to which a given bunch of grapes is subjected. The more energetic the shaking to which a given bunch of grapes is subjected, and the more frequently it is shaken, the more likely said bunch or its individual grapes is are to become detached from the vine. The number and the amplitude of the oscillations to which a given bunch of grapes is subjected depend on various parameters that may be selected, in particular on the amplitude and the frequency of the control mechanism associated with the shaker or beater members, on the length of the active zone of said shaker or beater members, on the stiffness or the flexibility thereof, and on the speed at which the machine advances, together with other factors which are imposed by the vine itself, in particular the way it is trained, its shape, and the resistance it gives to the motions of the beater or shaker members.

Simultaneously with causing bunches of grapes and individual grapes to become detached, the shaker or beater members damage the vine, at least to some extent, which may be detrimental to its health. When the shaker or beater members are designed to act on the vegetation of the vine, they generally give rise to the following types of damage:

(a) leaf stripping, thereby reducing the vine's photosynthesis activity and giving rise to difficulties in cleaning and harvesting (leaves mixed with the harvested grapes), and possibly giving rise to problems in winemaking;

(b) breaking of a large number of vine shoots, giving rise to difficulties in subsequent vine pruning;

(c) disbudding which may compromise future yield from the vine (fructification); and (d) injuries to vine shoots that facilitate the penetration of disease.

The more energetic and the more numerous the actions of the shaker or beater members on the vegetation of a vine plant, the greater the number of occasions on which the above-mentioned damage is suffered and the greater the amount of damage on each occasion. It is therefore generally necessary to find a compromise between the various above-mentioned parameters in order to obtain an acceptable percentage of harvested grapes or bunches of grapes without giving rise to too much damage to the vine.

In a first prior art type of picking machine (see French Pat. Nos. 2 293 132, 2 313 859, 2 373 222, 2 437 769, 2 509 955 and 2 554 673, and U.S. Pat. No. 4,418,521), the shaker assembly comprises two series of more or less flexible whips or flails which are vertically spaced and with the whips or flails in each series being rigidly fixed at one of their ends to a vertical flail-carrying plate capable of being driven with oscillating motion about a vertical axis, while the opposite ends or "points" of the flails are free and constitute the active portions thereof. In this first prior art type of picking machine the whips or flails must be relatively flexible in order to adapt individually to the variations in thickness of vine vegetation. In a row of vines, each vine plant generally has vegetation whose thickness varies in a vertical direction, and at a given height the thickness of the vegetation varies from one vine plant to the next. In order to obtain good adaptability to variations in vegetation thickness, it is advantageous to use whips or flails which are highly flexible. However, the more the whips or flails are flexible, the greater the variability in the real amplitude of the motion of the flail points, and consequently the greater the variability in shaking effectiveness, whereby harvesting effectiveness varies depending on the resistance that the vine vegetation puts up against the whips or flails. If the resistance is large, then the amplitude of whip or flail point motion is practically eliminated and the shaking efficiency from the point of view of detaching grapes or bunches of grapes is nil or nearly nil. In contrast, if the resistance is low, the amplitude of whip or flail point motion is large and the shaking efficiency is improved. However, if the resistance is very low or nil, then the points of the whips or flails tend to acquire excessive amplitude and speed (the flails are said to "race"). This happens in particular when the flails move past a vine plant whose vegetation is not robust or is thin or when the whips or flails move past a space or "hole" between two successive vine plants. This gives rise to very considerable leaf stripping and to a prohibitive number of vine shoots being broken, and may even lead to a weak vine plant being completely decapitated together with a portion of the immediately following vine plant. That is why it is normally necessary to use whips or flails which are semi-rigid or semi-flexible.

Further, in this first prior art type of picking machine, the whips or flails are relatively short (about one meter (m) long), such that their active portions in the vicinity of the whip or flail points are likewise short. Several solutions may be adopted in order to ensure that a given bunch of grapes is shaken a sufficient number of times to ensure that it is detached from the vine. A first solution naturally consists in increasing the frequency at which the flail-controlling mechanism oscillates, however this increases the speed of the flail points and increases the above-mentioned drawbacks which are related to high speed and large amplitude motion of the flail points when they encounter little resistance from the vegetation. A second solution consists in reducing the speed at which the picking machine moves forwards, however that increases the time required for picking. A third solution consists in increasing the length of the active flail zones by using flails which are longer and which are bent, with the facing active portions thereof being substantially mutually parallel (see French Pat. Nos. 2 313 859, 2 509 955, and 2,554,673, and U.S. Pat. No. 4,418,521). However, the amount by which the active portions of the flails can be lengthened is highly limited, in particular because of the mechanical behavior of the flails. A fourth solution consists in providing two successive sets of shakers (see for example French Pat. No. 2 293 132 and U.S. Pat. No. 4,418,52). However, this solution is relatively expensive (the machine chassis is longer and two sets of shakers and control mechanisms are associated therewith).

It is clear from the above, that in order to obtain flails or whips which adapt well to variations in the thickness of vine plant vegetation, both in the vertical direction up the vine plants and in the longitudinal direction along the rows of vines, and in order to obtain a high percentage of harvested fruit in a short period of time per unit cultivated area with a minimum of damage to the vines, the choices to be made between the various construction and operating parameters of prior art picking machines of the first type described above are difficult and can at best result in a compromise only.

In a second type of prior art picking machine (French Pat. Nos. 2 516 742 and 2 522 246), each beater in each of two sets of beaters is constituted by a metal rod of the piano wire type, with both ends of the rods being fixed rigidly to a frame-shaped vertical and longitudinal support, with one frame being provided for each series of beaters, and with each support being hinged to the chassis of the machine about a vertical axis which is situated close to one of its ends (French Pat. No. 2 516 742) or else which is movably mounted on the chassis by means for maintaining the two support frames permanently in mutually parallel positions as they perform oscillating motion (French Pat. No. 2 522 246). A reciprocating motion drive device is connected to each of the two support frames to cause them to oscillate about a mean position. Since both support frames are rigid and since the beaters have both ends rigidly fixed to the support frames, the speed of beater displacement and the real amplitude of their motion are both well controlled and correspond to the speed and amplitude of the reciprocating motion drive devices associated with the support frames. As a result, when vine vegetation puts up little resistance to the beaters, the beaters do not tend to "race", and under such conditions prior art picking machines of this second type give rise to considerably less damage to the vines than that caused by picking machines of the first type whose shaker members are constituted by relatively flexible whips or flails each having one end free. In addition, for identical amplitude of motion, at identical frequency of oscillation, and at identical speed of machine advance, because of the relatively long active portions of the beaters, they have an effect on each bunch of grapes which lasts longer than would be the case with prior art picking machines of the first type, which therefore makes it theoretically possible to increase the percentage of harvested fruit. However, although the beaters are intended to be made of piano wire, their capabilities in elastic deformation and consequently their capabilities in adapting to variations in thickness of vine vegetation or in the machine being misaligned relative to a row of vines are relatively poor. This is so much the case that in French Pat. No. 2 516 742 provision is made for each support frame to be fixed to the bottom end of a vertical arm whose top end is hinged to the chassis of the machine about both a horizontal axis and a longitudinal axis with each arm being returned to a vertical position by the combined effect of a mass and a spring. With such an assembly, the two series of beaters move away from each other and towards each other automatically as a function of varying thickness of vine vegetation as the machine moves along a row of vines. However this adaptation of the gap between the two series of beaters to the variation in the thickness of the vegetation is performed simultaneously by all of the beaters in each series. Consequently, when the beaters pass a vine plant whose vegetation varies considerably in thickness in the vertical direction, the gap between the two series of beaters adjusts automatically to the thickest portion of the vegetation on the vine plant. As a result, the beaters level with the thinner portions of the vegetation have little or no effect on these portions of the vegetation and only a small quantity of the grapes thereon are harvested, if any. As a result, it happens in practice and under identical operating conditions that prior art picking machines of the second type do not obtain a subsantially higher percentage of harvested fruit than can be obtained with prior art grape picking machines of the first type.

In a third type of prior art grape picking machine (French Pat. Nos. 2 417 247, 2 417 248 and 2 515 926, and U.S. Pat. Nos. 4,286,426 and 4,432,190), two substantially ski-shaped shaker members are provided each having a relatively long rectilinear portion and each having a sloping or curved portion at each end extending sideways out from the machine. The speed and the real amplitude of shaker member motion are well controlled and correspond to the speed and amplitude of the reciprocating motion drive devices associated with the shaker members. However, since the shaker members are very rigid, have relatively long active portions, and act on the top portions of the vine stocks, they run the risk of damaging said vine stocks by prolonged rubbing thereagainst. Further, they run the risk of uprooting a vine stock that happens to be particularly robust and rigid. Further, such a shaking system is effective only for those types of vine in which the fruit-bearing zone is located essentially in a narrow zone measured in the vertical direction and situated near to the top portion of the vine stock. It is not at all appropriate for cases where the fruit-bearing zone extends over a considerable height which may run from a few centimeters above the ground to a considerable distance (sometimes more than a meter) above the trunk or stock of the vine.

The main object of the present invention is to provide a machine for harvesting fruits and berries and the like, the machine having rod-shaped shaker members which are capable of adapting individually to variations in the thickness of the vegetation of the fruit trees or bushes as in the case of prior art picking machines of the first type having whips or flails, but in which the speed and the real amplitude of motion of the active portions are well controlled so that the shaking is effective even at relatively low frequencies of oscillation and regardless of the resistance put up by the vegetation, and so that the active portions of the rods do not have any tendency to "race" and to damage the fruit trees or bushes when their vegetation puts up low resistance.

The present invention also seeks to provide a harvesting machine in which the rod-shaped shaker members have active portions of considerably greater length than the active portions of the whips or flails of prior art picking machines of the first type, without a corresponding increasing in the speed and in the real amplitude of motion of the active portions of the rods, which increase in prior art machines having whips or flails gives rise to problems of flail mechanical performance and of increased damage to fruit trees and bushes.

SUMMARY OF THE INVENTION

To this end, the harvesting machine of the present invention includes the improvements whereby:

the rods are made of a material having a high degree of flexibilitY and are curved to be arcuate in shape, with the convex side of each arc facing the longitudinal mid axis of the machine;

the ends of the flexible rods are held at a substantially constant distance from said longitudinal mid axis; and the control mechanism is arranged to vary the curvature of the flexible rods cyclically about an average value of curvature, whereby any one of said flexible rods has a maximum value of curvature when the opposite flexible rod has a minimum value of curvature, and vice versa.

In one possible embodiment of the present invention, each flexible rod has one of its ends hinged to a fixed point of the machine and has its other end attached to a moving point which moves in a direction substantially parallel to the longitudinal mid axis of the machine. In another possible embodiment, each flexible rod has both of its ends attached to points which are movable in a direction substantially parallel to said longitudinal mid axis.

Given that the ends of each flexible rod are attached either to a fixed point and to a point that moves in a longitudinal direction, or else to two points that move in said longitudinal direction, the motion in the transverse direction of the intermediate portions of the flexible rods, i.e. their active portions, results from variation in the curvature of the flexible rods and the real amplitude of this motion is equal, for each flexible rod, to the difference between the deflection of the arc formed by the flexible rod when in its position of maximum curvature and when in its position of minimum curvature. This real amplitude of the motion is well controlled and depends practically solely on the amplitude of the motion of the control mechanism associated with the flexible rods. In particular, it depends very little or not at all on the frequency of oscillation of the control mechanism. Further, given that each rod is attached at both ends, there is no longer any risk, in the event that the rods encounter low resistance from the vegetation of fruit trees or bushes, that one of the ends of the rods might acquire a speed and an amplitude of motion that are large and uncontrolled. Consequently, under these conditions, the risks of damaging fruit trees and bushes are practically eliminated compared with picking machines in which the shaker members are constituted by whips or flails each having one free end. Further, and still because each flexible rod is attached at both ends, each rod can be made from a material that is much more flexible than the material used for such whips or flails that inlcude one free end as are used in prior picking machines. Even though each rod is attached at both ends, each rod can nevertheless adapt elastically and individually to the variations in thickness of the vegetation of the fruit trees and bushes by bending, whereby all of the rods act with the same efficiency at all levels up the vegetation for the purpose of detaching fruit, even if a given tree or bush has vegetation that varies in thickness to a large extent in the vertical direction. This is due not only to the high degree of flexibility of the rods and to their arcuate shape, but also to the fact that the ends of the rods are attached to their respective attachment points by hinges and, at least in one embodiment of the present invention, to the fact that one of the attachment points is movable to some extent in the longitudinal direction even when the control mechanism is stationary. Compared with prior picking machines, in which the beaters are constituted by metal rods having both ends fixed rigidly to oscillating support frames (French Pat. Nos. 2 516 742 and 2 522 246), the flexible rods of a harvesting machine in accordance with the present invention each have a much greater capability of individually adapting to variations in thickness of the vegetation, and at all levels of the vegetation, thus providing greater efficiency in harvesting fruit.

Further, tests performed on a harvesting machine in accordance with the present invention have shown that the percentage of fruit harvested remains substantially the same when the speed of machine advance is increased and/or when the frequency of oscillation of the control mechanism is reduced relative to the normal values for speed of advance and for frequency of oscillation used in prior picking machines. It may be that this is due to the fact that the active portions of the flexible rods are relatively longer. Whatever the reason, this result is advantageous insofar as an increase in the speed of advance of the machine reduces the time required for picking, and insofar as a reduction in the frequency of oscillation reduces wear of the moving mechanical parts and also reduces damage to the plants.

BRIEF DESCRIPTION OF THE DRAWINGS

Other features and advantages of the invention appear from the following description of various embodiments, given by way of example with reference to the accompanying drawings, in which:

FIG. 3 is a side elevation view on a larger scale showing a portion of the shaker assembly of the machine shown in FIGS. 1 and 2;

FIG. 4 is a schematic top view showing the shaker assembly of the machine shown in FIGS. 1 and 2;

MORE DETAILED DESCRIPTION

Figure 1:
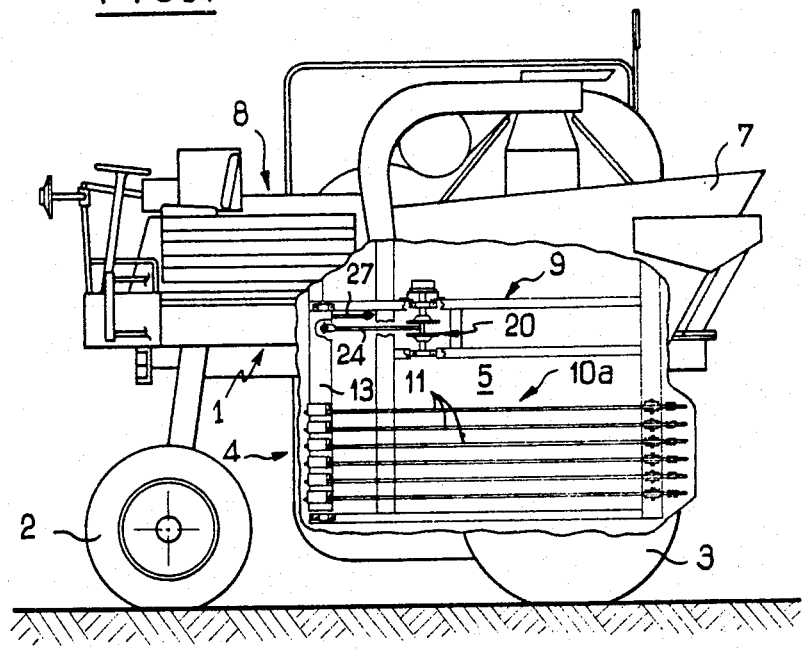
FIG. 1 is a partially broken side elevation view of a harvesting machine fitted with a shaker assembly in accordance with the present invention.
Figure 2:
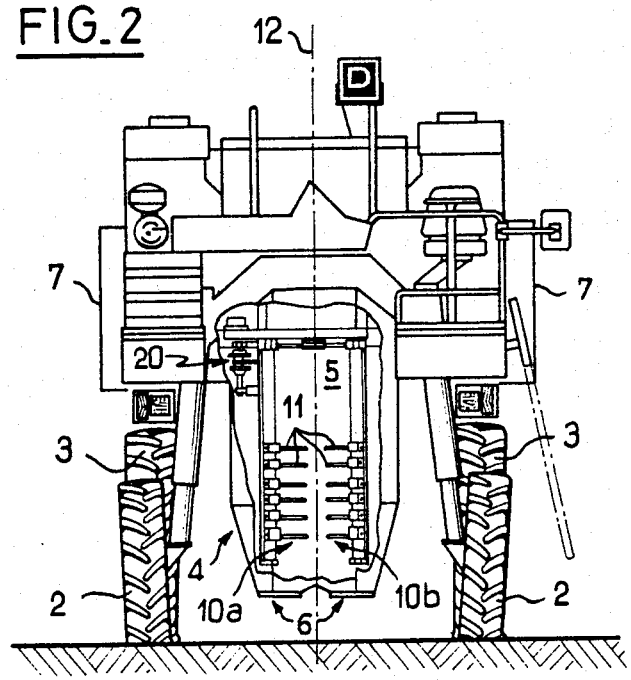
FIG. 2 is a partially broken front elevation view of the FIG. 1 picking machine.

The harvesting machine shown in FIGS. 1 and 2 comprises, in conventional manner. a chassis 1 provided with front wheels 2 and rear wheels 3 for moving over the ground. and which is in the form of a gantry in order to be able to straddle a row of plants. The chassis 1 carries, in known manner, a harvesting assembly 4 comprising a shaker assembly 5 and two elevator-conveyors 6 for collecting the grapes that have been detached by the shaker assembly 5 in order to convey them to a temporary storage tank 7 (generally two tanks are provided on respective sides of the machine), and it also has a motor 8 providing the power necessary for driving the various active members of the machine and also for driving its wheels if the machine is a self-propelled machine.

The harvesting assembly 4 may be fixed permanently to the chassis 1 of the machine or else it may be made in the form of a removable assembly which is detachably fixed to the chassis 1 so as to be capable of being replaced by other equipment or accessories, such as spraying equipment, pruning equipment, equipment for tilling the ground, etc. The harvesting assembly 4 can therefore either be supported directly by the chassis 1 of the machine or else it may be supported by an auxiliary chassis 9. In known manner, the auxiliary chassis 9 may be fixed relative to the chassis 1 or it may be rockably mounted thereon with its top portion being free to rock about a horizontal and longitudinal axis.

As can be seen more particularly in FIG. 2, the shaker assembly (to which the invention applies more particularly) comprises two sets 10i a and 10b of shaker members 11, with the two sets 10a and 10b being disposed facing one another on opposite sides of the longitudinal nid-plane 12 of the machine. As can be seen more clearly in FIG. 3, each set, e.g. the set 10a, may comprise six shaker members 11, for example, which are vertically spaced one above the other and which extend generally horizontally, even though they may also slope downwardly going from the front towards the rear of the machine. Although the shaker assembly shown in FIGS. 1 to 3 comprises two sets of six shaker members, it is obvious that the invention is not limited to that number of shaker members, but that the number may be decreased or increased depending on types of fruit tree or bush, and for a given type of fruit tree or bush depending on the variety, the way in which it has been trained, and the shape of the vegetation of the fruit trees or bushes, variations may also depend on whether it is desired to shake the fruit trees or bushes by their trunks or by their vegetation.

Each shaker member 11 is constituted by a rod whose cross-section is very small compared with its length, and which is made of a material which is very flexible and deformable, for example a polyamide or a glass fiber reinforced polyester. Good results have been obtained on vines when using rods having a circular section with a diameter of 25 mm and a length of 2 meters (m) made of a type 6 polyamide whose modulus of elasticity E is equal to 3000 N/mm².

Figure 5:
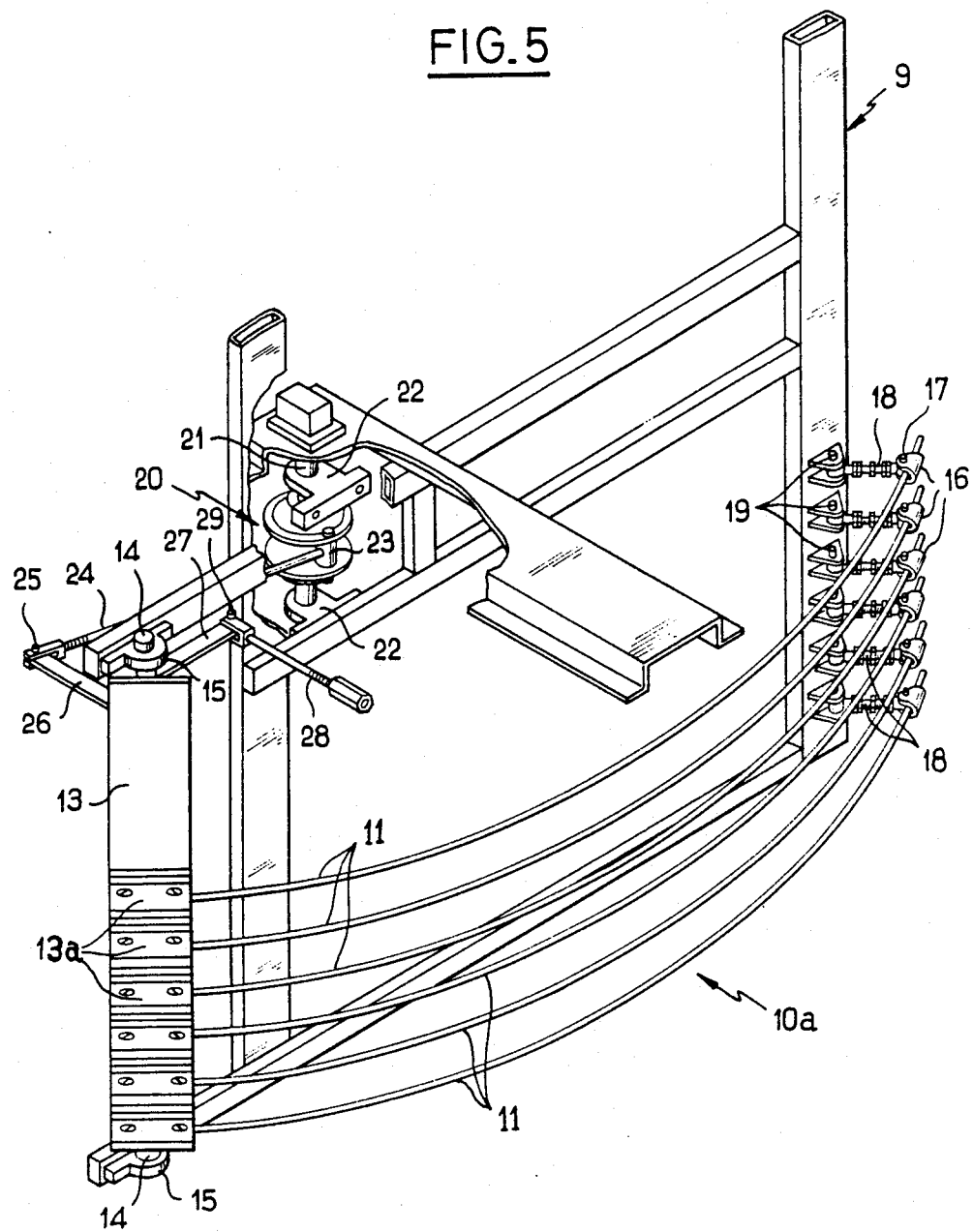
FIG. 5 is a perspective view of the portion of the shaker assembly shown in FIG. 3.

As can be seen more particularly in FIGS. 4 and 5, each rod 11 is curved to form an arc. The rods used may be pre-curved on manufacture or they may be rectilinear, in which case they are curved by bending when mounted on the shaking assembly 5.

As can be seen more particularly in FIGS. 3 to 5, one of the ends of each rod 11 is firmly clamped in a clamp 13a which is rigidly fixed to a vertical support plate 13 (with one plate 13 being provided for each of the two sets 10a and 10b rods 11). Each plate 13 is provided at each of its ends with a vertical axis stub axle 14 rotatably received in a bearing 15 fixed on the auxiliary chassis 9. The other end of each rod 11 is fixed in a support 16 which is hinged about a vertical axis 17 to one of the ends of a short link 18 whose other end is hinged to the auxiliary chassis 9 about a vertical axis 19.

A reciprocating motion drive device 20 is connected to the support plate 13 of one of the two sets 10a and 10b of rods 11 in order to cause the plate 13 to oscillate about the axis of the stub axles 14. The drive device 20 may be constituted, for example, by a connecting rod and crank system whose shaft 21 is rotatable in bearings 22 (FIGS. 3 and 5) which are fixed to the auxiliary chassis 9. The shaft 21 may be rotated by any appropriate transmission (not shown) connected to the output shaft from a motor, for example the motor 8 of the harvesting machine. One of the ends of the connecting rod 24 is hinged to the crank pin 23 of the connecting rod and crank pin system 20 while its opposite end is hinged about an axis 25 to a horizontal arm 26 which is rigidly fixed to the support plate 13 for the set 10a of rods 11. Two other horizontal arms 27 extend substantially parallel to the longitudinal mid axis 12 of the machine and are rigidly fixed to respective ones of the two vertical plates 13. The arms 27 are interconnected by a horizontal and transverse coupling rod 28 whose ends are hinged to respective ones of the free ends of the arms 27 about axes 29. Preferably, the coupling rod 28 is in the form of a rod whose length is adjustable, as shown in FIG. 4, in order to adjust the gap e between the flexible rods 11.

In the following description, it is assumed that the harvesting machine advances in the direction indicated by arrow F in FIG. 4. Under such conditions, the support plates 13 are at the front ends of the rods 11, whereas the supports 16 and the links 18 are at the rear ends of the rods 11, even though the opposite configuration could equally well be used. Under these conditions, going from the front to the rear of the machine, the arcuate shape of the flexible rods 11 in the two sets 10a and 10b form, between said sets, a converging inlet zone for fruit trees and bushes, followed by an active shaking zone extending over a length of about 1 (FIG. 4), which is in turn followed by a diverging outlet zone for the fruit trees or bushes.

In FIG. 4, letters A, B, C, and D indicate the positions taken up by the various components of the shaker assembly for four different angular positions A, B, C, and D of the connecting rod and crank drive system 20. From FIG. 4, it is clear that during rotation of the crank pin 23 about the axis of the shaft 21, the curvature of the flexible rods 11 varies cyclically about an average value of curvature which corresponds to positions A and C and which lies between a minimum curvature and a maximum curvature. It can also be seen that the flexible rods 11 of the set 10a are at minimum curvature when the flexible rods 11 of the set 10b are at maximum curvature (position B), and conversely that the rods 11 of the set 10a are at maximum curvature when the rods 11 of the set 10b are at minimum curvature (position D). It can also be seen that while the rods 11 are bending from their minimum curvature position towards their maximum curvature position, their front and rear ends remain at a substantially constant distance from the longitudinal mid axis 12, whereas the active shaking zone 1 reciprocates transversely on either side of said longitudinal axis 12. The amplitude of the transverse movement of the active portion of the flexible rods 11 depends on their maximum and minimum values of curvature which in turn depend on the eccentricity of the crank pin 23 relative to the axis of the shaft 21. Preferably, the eccentricity of the crank pin 23 is adjustable in known manner in order to make it possible to adjust the amplitude of the transverse motion of the active portion of the flexible rods 11. Preferably, the connecting rod 24 is also provided in the form of a rod of variable length in order to make it possible to adjust the average position (positions A, C) of the rods 11 so that in this position the active portions of the rods in the two sets 10a and 10b respectively are disposed symmetrically about the longitudinal mid axis 12.

Figure 6:
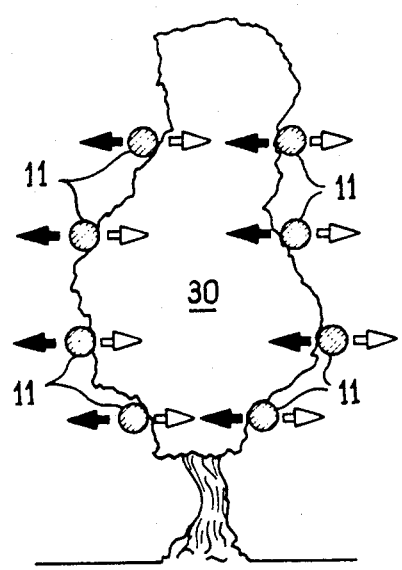
FIG. 6 shows how the flexible rods of the shaker assembly act on a fruit tree or bush, for example on a vine plant.

FIG. 6 shows how the flexible rods 11 of the shaker assembly of a harvesting machine in accordance with the present invention are capable of adapting individually to the thickness of vegetation 30 on a fruit tree or bush such as a vine plant. This may be explained as follows. When a vine plant arrives in the converging inlet portion between the two sets 10a and 10b of rods 11, the vegetation applies forces to the rods 11 such that the longitudinal components thereof are transmitted by said rods to the links 18 which pivot rearwardly about their axes 19. Simultaneously, by virtue of their high degree of flexibility, the rods 11 deform elastically (their curvature decreases) and move further and further away from the longitudinal mid axis 12 depending on the thickness of the vegetation level with each rod 11. Conversely, during shaking, the transverse forces applied to the rods 11 which are due to the resistance put up by the vegetation against said rods 11 have a reduced tendency to pivot the links 18 rearwardly about their axes 19. This is because the links 18 extend roughly transversely relative to the longitudinal mid axis 12 and are substantially perpendicular to the rear ends of the rods 11. Consequently, during shaking, the rods 11 deform relatively little by bending and the amplitude of their motion is practically fully transmitted to the vegetation.

Figure 7:
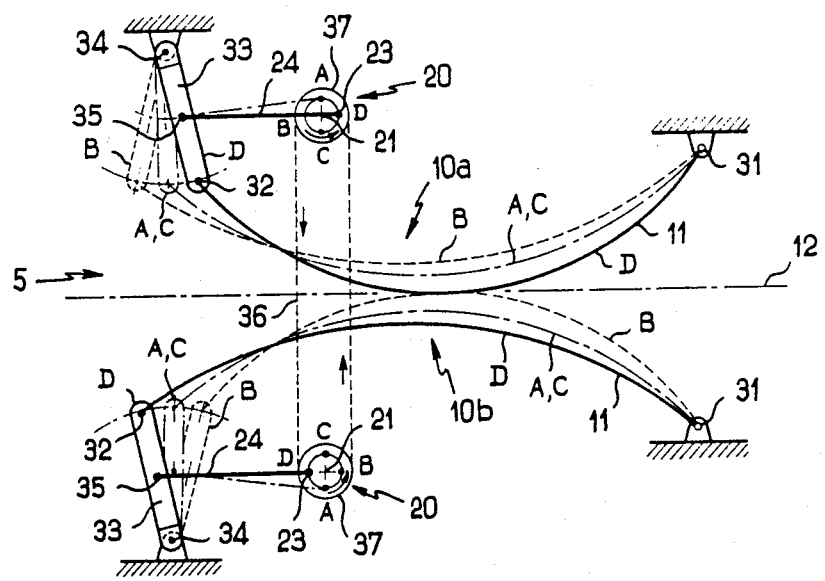
FIG. 7 is a view similar to FIG. 4 showing a second embodiment of the shaker assembly.
Figure 8:
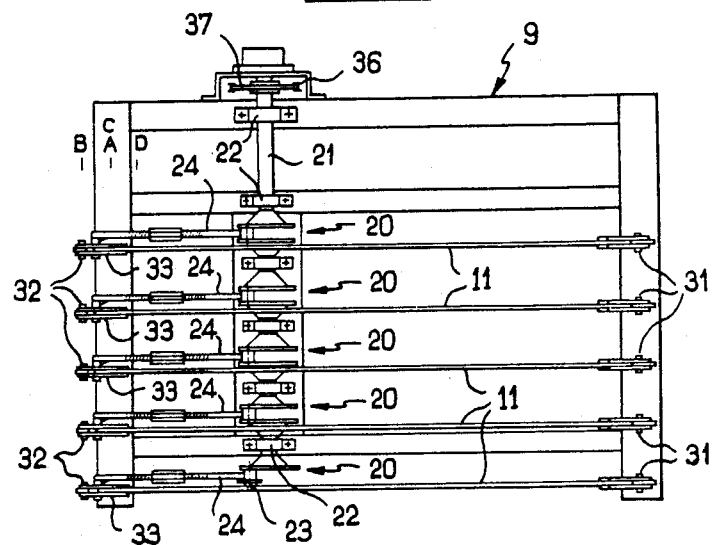
FIG. 8 is a side elevation of a portion of the FIG. 7 shaker assembly.

FIGS. 7 and 8 show another embodiment of the shaker assembly 5 in which each flexible rod 11 has one of its ends hinged about a vertical axis 31 on the auxiliary chassis 9, and has its other end hinged about a vertical axis 32 on one of the ends of a horizontal lever 33 which extends generally transversely to the longitudinal mid axis 12 and which has its opposite end hinged about an axis 34 on the auxiliary chassis 9. Each of the levers 33 is associated with a reciprocating motion drive device 20 enabling the lever 33 to oscillate about its axis 34 and thus vary the curvature of the flexible rods 11 by bending them in a manner similar to that described above with reference to the embodiment shown in FIGS. 3 to 5. Each drive device 20 may be constituted, for example, by a crank and a connecting rod, with the connecting rod 24 being hinged about an axis 35 on the corresponding lever 33. All of the connecting rods 24 are preferably made in the form of adjustable length rods in order to make it possible to adjust the initial curvature of each rod 11, and consequently to adjust the gap between the active portions of the rods 11 in the two sets 10a and 10b. In this manner, the gap may be adjusted to a common value for all of the pairs of rods that face one another or, if so desired, to different values for different pairs of rods, depending on the general shape of the vine plants to be picked.

The crank pins 23 of all of the connecting rods and crank drive systems 20 associated with the rods 11 in the set 10a are mounted at identical angular positions about a first vertical common drive shaft 21. Similarly, crank pins 23 of the connecting rod and crank drive system 20 associated with the rods 11 of the set 10b are likewise mounted on a second common vertical drive shaft 21 at identical angular positions, with said positions being offset by 180° relative to the positions of the crank pins 23 of the first shaft 21 as shown in FIG. 7. The two shafts 21 are coupled together and are caused to rotate in synchronism by a transmission including an endless chain 36 and two chain wheels 37 fixed on respective ones of the shafts 21. One of the two shafts 21 may be rotated by an appropriate transmission (not shown) connected, for example, to the output shaft of the motor 8 of the harvesting machine. Preferably, the eccentricity of each crank pin 23 relative to the corresponding shaft 21 is adjustable in known manner in order to allow the amplitude of the transverse motion of the active portion of each flexible rod 11 to be adjusted individually. In this manner, all of the crank pins 23 can be adjusted to have the same eccentricity, in which case all of the rods 11 have the same amplitude of motion. However, if so desired, the eccentricity of the crank pins 23 of each pair of facing rods 11 may be adjusted to a common value which is different from the value to which the crank pins associated with other pairs of rods 11 are adjusted. In this case, the amplitude of the motion of each pair of rods 11 may differ from that of the other pair of rods, and this may be advantageous in some cases in order to provide different shaking action at different levels of the trunk or of the vegetation of fruit trees or bushes.

Although the embodiment shown in FIGS. 7 and 8 has a crank and connecting rod drive system 20 associated with each flexible rod 11, it is obvious that in a simplified embodiment, the levers 33 associated with the rods 11 of the set 10a could be rigidly interconnected and activated by a single connecting rod and crank drive system 20. Similarly, the levers 33 associated with the rods 11 of the set 10b could be rigidly interconnected and actuated by a single connecting rod and crank drive system 20. Further, instead of being hinged about axes 31 on the auxiliary chassis 9, the ends of the flexible rods 11 furthest from the levers 33 could also be hinged to levers identical to the levers 33 and driven in oscillating motion in phase opposition relative to the motion of the levers 33, by reciprocating motion drive means which may be the drive systems 20 themselves, in which case each of them is common to the front and rear levers 33, or the drive systems may be distinct from the drive systems 20.

Figure 9:
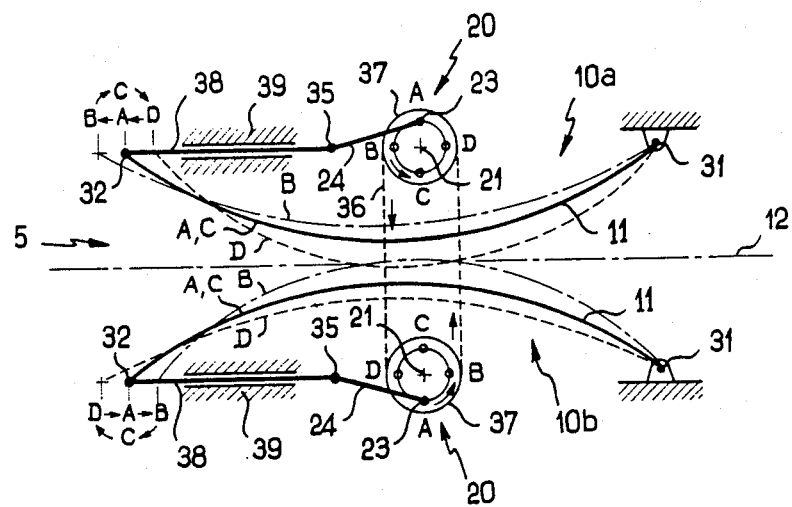
FIG. 9 is a view similar to FIGS. 4 and 7 showing a third embodiment of the shaker assembly.
Figure 10:
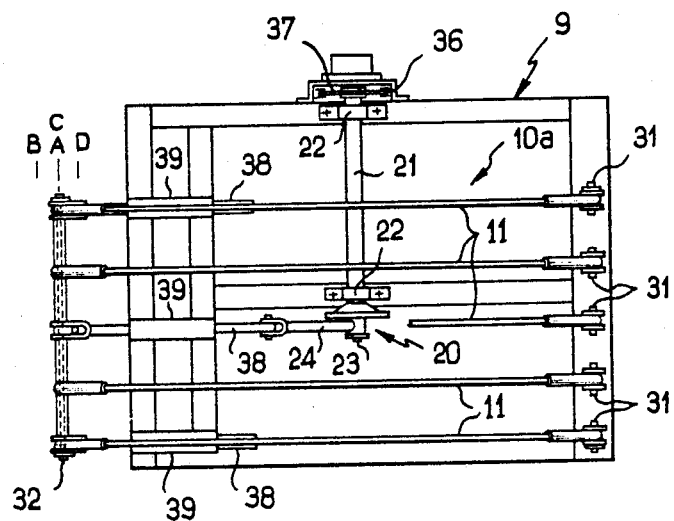
FIG. 10 is a side elevation of a portion of the FIG. 9 shaker assembly.

FIGS. 9 and 10 show another embodiment of the shaker assembly 5 in which components which are identical or which perform the same function as those shown in FIGS. 7 and 8 are designated by the same reference numerals and are therefore not described in detail again. The shaker assembly of FIGS. 9 and 10 differs from that of FIGS. 7 and 8 in that the levers 33 of FIGS. 7 and 8 are replaced by cylindrical horizontal rods 38 slidably mounted in cylindrical sleeves 39 which are fixed to the auxiliary chassis 9 and whose axes extend parallel to the longitudinal mid axis 12. At least two sliding rods 38 are provided for each of the two sets 10a and 10b of flexible rods 11, for example three sliding rods may be provided as shown in FIG. 10. One end of each sliding rod 38 supports a vertical shaft 32 which is common to all of the flexible rods in the set 10a (or in the set 10b) and about which the flexible rods 11 are hinged so as to be capable of pivoting independently from one another about the axis of the shaft 32. A crank and connecting rod drive system 20 is connected to one of the three sliding rods 38, e.g. the middle rod, so as to reciprocate the shaft 32 transversely to its own length and in a direction parallel to the longitudinal mid axis 12, thereby modifying the curvature of all of the flexible rods 11 of the set 10a (or of the set 10b) simultaneously and by the same amount between a minimum curvature value and a maximum curvature value, with said minimum and maximum values depending on the eccentricity of the crank pin 23 of the drive system 20. As before, the eccentricity of the crank pins 23 of each of the two drive systems 20 associated with respective ones of the sets 10a and 10b I of flexible rods 11 is adjustable in known manner in order to make it possible to adjust the minimum and maximum curvature values of the flexible rods 11 and consequently to adjust the amplitude of the transverse motion of the active portions of said flexible rods. In addition and as before, the connecting rods 24 of the two drive systems are preferably provided in the form of adjustable length rods in order to make it possible to adjust the gap between the two sets 10a and 10b of flexible rods in the region of their active portions.

Although three sliding rods 38 are provided in the FIG. 10 embodiment for each set of flexible rods 11, only two sliding rods need be provided. In this case, it is preferable for two drive systems 20 to be provided having their crank pins 23 mounted at identical angles about the drive shaft 21 and having respective connecting rods 24 connected to the slide rods 38. In another variant embodiment, a drive system 20 may be associated with each flexible rod 11 of each of the sets 10a or 10b in a disposition similar to that shown in FIG. 8. In this case, each flexible rod 11 of the set 10a (or of the set 10b) is hinged about its own shaft 32 (with the shaft 32 no longer being common to all of the flexible rods 11 of the set 10a) to one of the ends of a corresponding sliding rod 38, with the connecting rods 28 of the drive systems 20 being connected to respective opposite ends of the sliding rods 38. In this way, it is possible to adjust the amplitude of the transverse motion of the active portions of each of the pairs of flexible rods 11 independently from the transverse motion of the other pairs of flexible rods by appropriately adjusting the eccentricity of the crank pins 23 of the drive systems 20 associated with each of the facing pairs of flexible rods 11.

Figure 11:
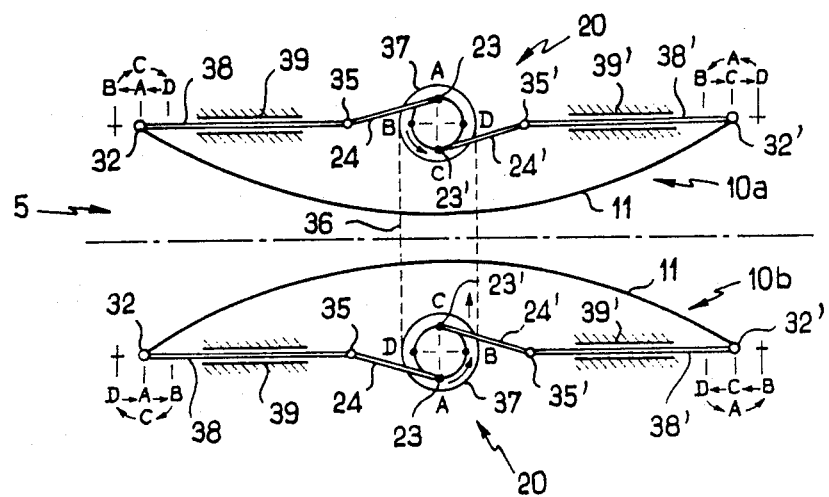
FIG. 11 is a view similar to FIG. 9 showing a variant of the FIG. 9 shaker assembly.

In the variant embodiment shown in FIG. 11, each flexible rod 11 in each of the two sets 10a and 10b has one of its ends hinged about a shaft 32 to one of the ends of a cylindrical rod 38 which slides in a cylindrical sleeve 39 and which has its opposite end hinged about an axis 35 to one of the ends of a connecting rod 24 whose own opposite end is hinged to the crank pin 23 of a reciprocating motion drive system 20 in a disposition similar to that shown in FIG. 9. Similarly, the opposite end of each flexible rod 11 is hinged about a shaft 32' to one of the ends of a cylindrical rod 38' slidably mounted in a cylindrical sleeve 39' and having its opposite end hinged about an axis 35' to one of the ends of a connecting rod 24' whose opposite end is hinged to a crank pin 23' which is diametrically opposite to the crank pin 23 of the drive system 20.

Naturally, the embodiments of the present invention that have been described above are given purely by way of non-limiting example, and numerous modifications may easily be provided thereto by the person skilled in the art without thereby going beyond the scope of the invention as defined in the following claims. Thus, in particular, instead of using connecting rod and crank systems as reciprocating motion drive devices, it would also be possible to use double acting hydraulic actuators. Further, although the present description has been described more particularly with reference to a self-propelled harvesting machine, it is clear that the invention is equally applicable to tractor-mounted harvesting machines.

I claim:

1. A machine for harvesting fruit and berries and the like, from fruit trees and bushes planted in rows, the machine comprising a straddling chassis capable of moving along a field, together with a shaker assembly mounted on the chassis and including at least one pair of elongated shaker members which extend generally horizontally in the direction of the longitudinal mid axis of the machine and which are spaced transversely from one another and situated respectively on opposite sides of said longitudinal mid axis, each shaker member being constituted by a rod having both of its ends connected to a support and shaped in such a manner that, going rearwardly from the front of the machine, and together with the opposite rod, it defines a converging inlet, an active shaking zone, and a diverging outlet for fruit trees and bushes, the shaker assembly further including a control mechanism connected to the rods to drive them synchronously with a reciprocating motion in a direction extending transversely relative to said longitudinal mid axis, the machine including the improvements wherein:

the rods are made of a material having a high degree of flexibility and are curved to be arcuate in shape, with the convex side of each arc facing the longitudinal mid axis of the machine;

the ends of the flexible rods are held at a substantially constant distance from said longitudinal mid axis; and the control mechanism is arranged to vary the curvature of the flexible rods cyclically about an average value of curvature, whereby any one of said flexible rods has a maximum value of curvature when the opposite flexible rod has a minimum value of curvature, and vice versa.

2. A machine according to claim 1, wherein each flexible rod has one of its ends hinged to a fixed point of the machine and has its other end attached to a moving point which moves in a direction substantially parallel to the longitudinal mid axis of the machine.

3. A machine according to claim 1, wherein each flexible rod has both of its ends attached to points which are movable in a direction substantially parallel to the longitudinal mid axis of the machine.

4. A machine according to claim 2, wherein each flexible rod has one of its ends fixed rigidly to a support which is pivotally mounted on the chassis about a first vertical axis, and has its opposite end hinged about a second vertical axis to one of the ends of a short horizontal link which extends generally transversely relative to the longitudinal mid axis of the machine and whose other end is hinged to the chassis about a third vertical axis, and wherein the control mechanism includes: a reciprocating motion drive device which is connected to the support of one of the two flexible rods; a first horizontal arm which is fixed rigidly to the support of one of the two flexible rods and which extends generally parallel to the longitudinal mid axis of the machine; a second horizontal arm which is fixed rigidly to the support of the other flexible rod and which is generally parallel to the first arm; and a transverse horizontal coupling rod whose ends are hinged to the free ends of the respective ones of the first and second arms.

5. A machine according to claim 4, wherein the coupling rod is adjustable in length.

6. A machine according to claim 4, wherein the reciprocating motion drive device is constituted by a connecting rod and crank system in which the connecting rod is hinged to a third arm which is rigidly fixed to the support of one of the two flexible rods.

7. A machine according to claim 4, wherein the shaker assembly comprises two sets of flexible rods disposed on respective sides of the longitudinal mid axis of the machine, with the flexible rods of each set being spaced apart vertically and situated in substantially horizontal planes, and wherein the support pivoting about first vertical axis extends vertically and is common to all of the flexible rods of the corresponding set of rods, with the other end of each flexible rod in the set of rods being connected to the chassis via a corresponding short link.

8. A machine according to claim 2, wherein each flexible rod has one of its ends hinged about a first vertical axis on the chassis of the machine and has its opposite end hinged about a second vertical axis on one of the ends of a horizontal lever which extends generally transversely relative to the longitudinal mid axis of the machine and whose opposite end is hinged about a third vertical axis to the chassis of the machine, and wherein the control mechanism includes first and second reciprocating motion drive devices which are connected to respective ones of the levers associated with two flexible rods in order to cause said levers to oscillate respectively about the third vertical axes, with the first and second drive devices being actuated in phase opposition.

9. A machine according to claim 8, wherein each of the first and second drive devices is constituted by a connecting rod and crank system in which the connecting rod is connected to one of said levers, with the cranks or crank pins of the two connecting rod and crank systems being angularly offset by 180° and coupled by a pulley and endless chain transmission.

10. A machine according to claim 9, wherein the shaker assembly comprises two sets of flexible rods disposed on respective sides of the longitudinal mid axis of the machine, the flexible rods of each set being spaced apart vertically and being situated in substantially horizontal planes, the machine including a respective transverse horizontal lever associated with each of the flexible rods of each of the two sets of rods, together with a respective connecting rod and crank system, the cranks or crank pins associated with one of the sets of flexible rods situated on one side of the longitudinal mid axis being mounted at identical angular positions relative to a first common vertical drive shaft, and the cranks or crank pins associated with the other set of flexible rods situated on the other side of the longitudinal mid axis being mounted on a second common vertical drive shaft at mutually identical angular positions which are offset by 180° relative to the angular positions of the cranks or crank pins of the first shaft, the two shafts being coupled together by said pulley and endless chain transmission.

11. A machine according to claim 2, wherein each flexible rod has one of its ends hinged about a first vertical axis to the chassis of the machine, and has its opposite end hinged about a second vertical axis to one of the ends of a horizontal rod which is slidably mounted relative to the chassis of the machine in a direction parallel to the longitudinal mid axis, and wherein the control mechanism comprises first and second reciprocating motion drive devices which are connected respectively to the opposite ends of the sliding rods associated with respective ones of the flexible rods, the first and second drive devices being actuated in phase opposition.

12. A machine according to claim 11, wherein each of the first and second drive devices is constituted by a connecting rod and crank system, with the connecting rod being connected to one of said sliding rods, and with the cranks or crank pins of the two connecting rod and crank systems bring angularly offset by 180° and being coupled by a pulley and endless chain transmission.

13. A machine according to claim 12, wherein the shaker assembly comprises two sets of flexible rods disposed on respective sides of the longitudinal mid axis of the machine, the flexible rods of each set being spaced apart vertically and being situated in substantially horizontal planes, the flexible rods of each of the two sets have one end hinged to a vertical shaft which is common to the flexible rods of the corresponding set of rods, said common shaft being supported by the corresponding ends of at least two parallel horizontal rods which are slidably mounted in the chassis of the machine to slide in a direction parallel to the longitudinal mid axis, and a connecting rod and crank system being connected to the opposite end of at least one of the two sliding rods associated with said common shaft.

14. A machine according to any one of claims 6, 9, 10, 12, and 13, wherein the connecting rod of each connecting rod and crank system is adjustable in length.

15. A machine according to any one of claims 6, 9, 10, 12, and 13, wherein the crank or crank pin of each connecting rod and crank system is adjustable in eccentricity.

16. A machine according to claim 1, wherein the flexible rods are about 2 m long and have a circular cross-section with a diameter of about 25 mm.

17. A machine according to claim 1, wherein the flexible rods are made of a polyamide having a modulus of elasticity of about 3000 N/mm$^2$.

* * * * *